3,362,689
IMMERSION MIXING APPARATUS
Nathan Rothman and Gordon D. Love, London England, assignors to Silverson Machines Limited
Filed Nov. 15, 1966, Ser. No. 594,492
10 Claims. (Cl. 259—8)

ABSTRACT OF THE DISCLOSURE

An immersion mixing apparatus, suitable for inclusion in a pipe line, comprising a body member having an inlet and an outlet, the inlet and outlet being adapted each for connection to a pipe, a partition wall within the body member formed with an aperture which effects communication between the inlet and the outlet, a mixer assembly including a mixer casing which is disposed on the outlet side of the partition wall, has an inlet at one end thereof disposed to receive material flowing through the aperture in the partition wall from the body inlet to the outlet, and is formed in a side wall thereof with outlet means opening to the outlet side of the partition wall, an impeller which is mounted on a driven shaft and includes a plurality of blades which, upon rotation of the shaft, sweep out a volume whose radially outer surface corresponds in shape with and is disposed adjacent to the inner surface of the side wall of the casing, and means which serve to prevent, or substantially prevent, axial flow of material from the end of the assembly remote from the inlet to the casing, the impeller being adapted to force material entering the casing radially outwardly across the narrow space between the impeller blades and the side wall of the casing to the outlet means and the side wall of the casing impeding the outward flow of material and causing the material to be subjected, during its delayed passage between the impeller blades and the side wall, to large shearing forces which effect mixing of the material.

---

This invention relates to immersion mixing apparatus.

Immersion mixing apparatus is commonly used either for homogenising solutions of liquid in liquid or for milling of mixtures comprising particulate solid material in liquid. When conveying along a pipe line a homogenised liquid in liquid solution difficulty is experienced in maintaining the homogenous state of the solution. Similarly, when conveying solutions of liquid and particulate solid along a pipe line there is a tendency for the solid material to separate out of the solution. These difficulties have in the past been reduced by the introduction in the pipe line of mixing apparatus of the propeller type. This has not led to satisfactory results because the propeller really acts as nothing more than a stirrer which is by-passed by an appreciable part of the flow through the pipe line.

Immersion mixing apparatus, suitable for inclusion in a pipe line, according to the present invention, comprises a body member having an inlet and an outlet, the inlet and outlet being adapted each for connection to a pipe, a partition wall within the body member formed with an aperture which effects communication between the inlet and the outlet, a mixer assembly including a mixer casing which is disposed on the outside side of the partition wall, has an inlet at one end thereof disposed to receive material flowing through the aperture in the partition wall from the body inlet to the outlet, and is formed in a side wall thereof with outlet means opening to the outlet side of the partition wall, an impeller which is mounted on a driven shaft and includes a plurality of blades which, upon rotation of the shaft, sweep out a volume whose radially outer surface corresponds in shape with, and is disposed adjacent to, the inner surface of the side wall of the casing, and means which serve to prevent, or substantially prevent, axial flow of material from the end of the assembly remote from the inlet to the casing, the impeller being adapted to force material entering the casing radially outwardly across the narrow space between the impeller blades and the side wall of the casing to the outlet means and the side wall of the casing impeding the outward flow of material and causing the material to be subjected, during its delayed passage between the impeller blades and the side wall, to large shearing forces which effect mixing of the material.

It will be appreciated that with the apparatus of the invention the total flow of solution passes through the mixer casing from which it is forced out by the impeller. The impeller and its containing casing thus exerts a thorough mixing action on the whole of the flow through the body member.

Figure 1:
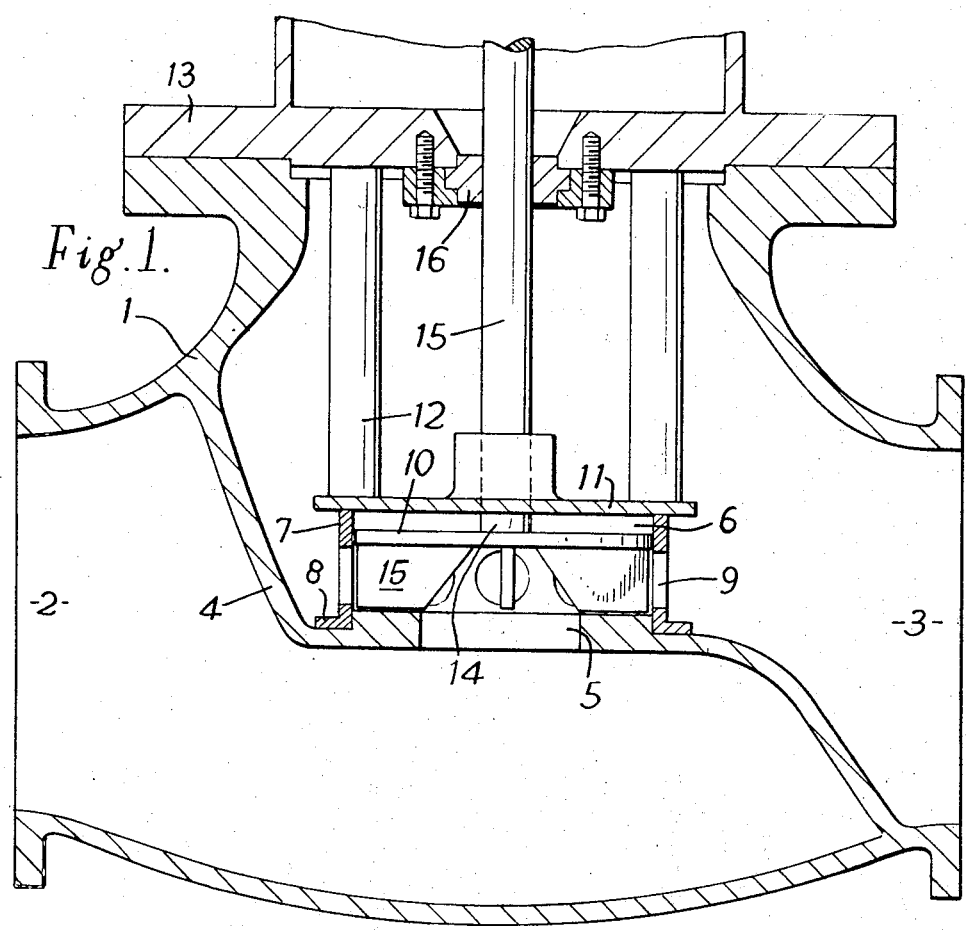
Figure 2:
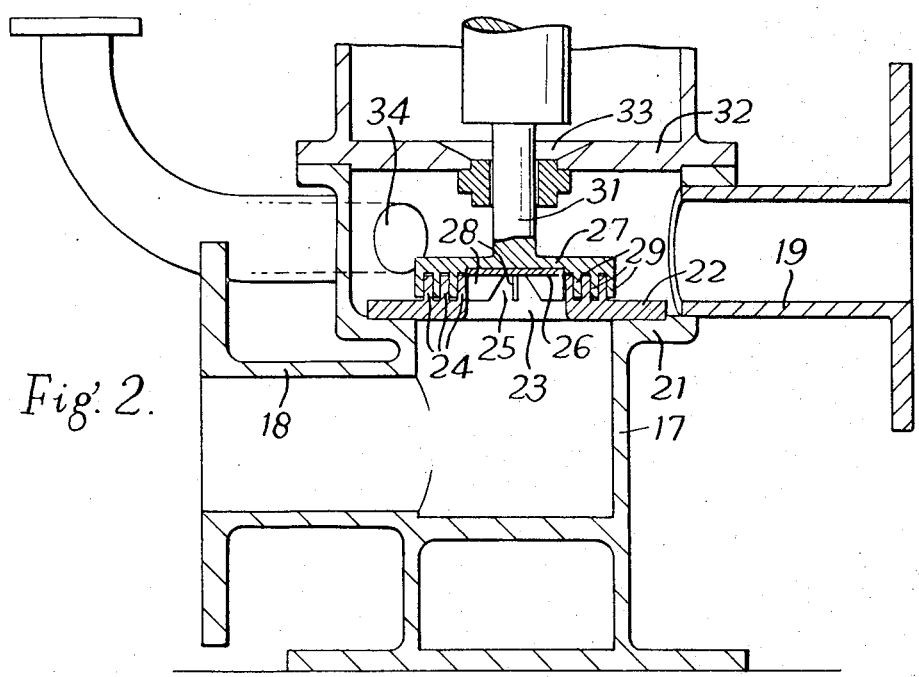

The invention will now be described, by way of example, with reference to the accompanying drawings in which:

FIGURE 1 shows a longitudinal section through an immersion mixing apparatus according to the invention; and FIGURE 2 shows a longitudinal section through a further apparatus according to the invention.

In the embodiment of the invention shown in FIGURE 1 a body member 1 is formed with a flanged inlet 2 and a flanged outlet 3 which is of the same size and shape as the inlet and is coaxial therewith. Separating the inlet of the body member from the outlet thereof is a partition wall 4 and formed in a horizontally extending part of this wall is a circular aperture 5.

On the outlet side of the aperture 5 in the partition wall 4 is a mixer assembly comprising a mixer casing 6 within which is disposed a bladed impeller 14.

The casing 6 of the assembly has an upright, cylindrical side wall 7, an upper end wall 11 and an inlet opening at its lower end. A flange 8 at the lower end of the side wall 7 is secured to the partition wall 4 so that the casing 6 is disposed coaxially of the aperture 5 and the inlet end of the casing, which is of larger diameter than the diameter of the aperture 5, receives the total flow of material through the aperture. Outlet apertures 9 are formed in the side wall 7 and open to the outlet side of the partition wall. The upper end wall 11 is carried on a plurality of vertical rods 12 which are mounted on a cover plate 13 of a flanged lateral opening in the body member 1.

The impeller 14 is secured to the lower end of a shaft 15 of an electric motor which is also mounted on the cover plate 13 and is not shown in the drawings. A fluid-tight seal 16 is provided where the shaft 15 extends through the cover plate 13.

The impeller 14 of the mixer assembly includes a circular plate 10 and four impeller blades 15. The plate 10 is disposed in a horizontal plane in an upper part of the casing and the four blades 15 extend downwardly from the lower surface of the plate 10 and are respectively disposed in upright planes successively angularly spaced by 90°. A radially outer edge of each impeller blade is upright and is adjacent the inner surface of the side wall 7 of the casing 6. Each blade 15 includes an outer section of uniform axial length which extends radially inwardly from the outer edge of the blade to a radial location adjacent the edge of the aperture 5 in the partition wall 4 and an inner section wherein the axial length of the blade decreases uniformly to zero.

If desired, a cylindrical mesh screen may be interposed between the impeller 14 and the casing 6. This screen effects reduction of particle size in the case of a solution of particulate solid in liquid whilst, in the case of a liquid in liquid solution, the screen improves the homogeneity of the mixed solution.

The flanged inlet 2 of the body member 1 is connected to the outlet of a shut-off valve (not shown in the drawings) of the kind commonly known as a globe valve and the inlet to the valve is connected to an outlet pipe of a pressure vessel containing solution.

The flanged outlet 3 of the body member is connected to a bifurcated pipe (not shown in the drawing) each branch of which is provided with a stop valve, suitably, a globe valve. One branch of the bifurcated pipe constitutes an outlet branch whilst the other branch leads back to an upper part of the vessel.

In operation, the shut-off valve in the outlet from the vessel and that in the recirculating branch of the bifurcated pipe are opened whilst the shut-off valve in the outlet branch of the bifurcated pipe is closed. The mixer motor is then started and the impeller 14 rotates within the casing 6, forcing solution within the casing outwardly towards the side wall 7 and drawing further solution into the casing via the inlet at its lower end and the aperture 5 in the partition wall 4.

The rotating impeller blades 15 sweep out a volume whose radially outer surface corresponds in shape with, and is disposed adjacent to, the inner surface of the side wall 7. The latter serves to impede the outward flow of material from the blades 15 and before the material can pass through the apertures 9 it is caused to spend some time in the narrow space between the side wall 7 and the rotating blades 15. During this time the material is subjected to large shearing forces which effect thorough mixing thereof.

The upper end wall 11 of the casing 6 prevents axial flow of material from the upper end of the casing and ensures that all material which reaches the outlet side of the partition wall 4 must have passed through the aperture 9.

The mixer motor is run until all the solution in the vessel has traversed the mixer and been mixed to the required extent. The shut-off valve in the recirculating branch is then closed whilst that in the outlet branch is opened so that the mixer is caused to flow through the outlet branch. Since the mixer assembly acts on the whole of the flow from the vessel it will be appreciated that the solution flowing to the outlet branch is in an intimately mixed state.

In this embodiment the radially inner edge of the outer section of each blade 15 is disposed at the same radial location as the edge of the aperture 5. If the aperture 5 is increased in diameter, whilst the dimensions of the blades 15 remain constant, the "pumping action" of the impeller 14, i.e. the volume of material forced through the casing in a given time, is reduced. On the other hand, this arrangement is advantageous if the apparatus is used for mixing large particles of solid in a liquid, when the particles tend to be broken up by impinging against the sharp corner formed between the inner and outer sections of each blade 15. If the diameter of the aperture 5 is varied and the dimensions of the blades are varied accordingly so that the inner edge of each outer blade section is maintained at the same radial location as the edge of the aperture 5 there is an optimum size of aperture which will result in maximum pumping action.

In the embodiment of the invention illustrated in FIGURE 2 a body member 17 is formed with a flanged inlet pipe 18 and a flanged outlet pipe 19 which extend in opposite directions from the member and are laterally displaced relative to one another. Secured to a shoulder 21 within the body member 17 is an annular plate 22 whose central aperture 23 effects communication between the inlet and outlet pipes.

On its outlet side the annular plate 22 is formed with three concentric rings 24 of teeth which form the side wall of a mixer casing 25. The rings 24 are of equal thickness and are radially spaced by distances equal to that thickness, the internal diameter of the inner ring being equal to the diameter of the aperture 23 in the annular plate.

Co-operating with the casing 25 is an impeller 27 which includes a circular plate 26 disposed immediately above the casing and having a plurality of blades 28 which are disposed in respective planes substantially normal to the plate and extend downwardly from its lower surface into the cylindrical space within the inner ring of teeth. Each blade has its radially outer edge upright and adjacent the inner surface of the inner of the rings 24 of teeth. Secured to the circular plate 26 of the impeller 27 are three concentric rings 29 of teeth of thickness and spacing equal to those of the casing 25, the two innermost rings of the impeller being disposed between respective pairs of rings of the casing and the outermost impeller ring being disposed exteriorly of the outer ring of the casing.

A cylindrical mesh screen may also be provided on the annular plate 22, outwardly of the outermost of the rings 24 of teeth and radially spaced therefrom by a distance equal to the thickness of the outermost ring 29 of teeth on the impeller 26.

Each ring of teeth on the casing and impeller is in the form of a cylindrical member having slots of equal width and equal spacing extending axially along its side wall. The outer end of each slot on the impeller is angularly displaced in one sense relative to its inner end whilst the slots forming the teeth on the casing have their outer ends displaced in the opposite sense, when viewed in plan.

The impeller 27 is carried at the lower end of a driven shaft 31 which extends through a cover plate 32 over a lateral opening in the body member 17, a fluid-tight seal 35 being provided between the shaft and plate. An electric motor for driving the shaft is also mounted on the cover plate.

The flanged inlet pipe 18 of the body member 17 is connected to the outlet of a shut-off valve (not shown in the drawing) of the kind commonly known as a globe valve and the inlet to the valve is connected to an outlet pipe from the bottom of a pressure vessel containing material to be mixed.

The flanged outlet pipe 19 of the body member is also provided with a shut-off valve, suitably a globe valve, and constitutes an outlet branch of the apparatus.

Finally, a further flanged outlet 34 is also provided in the body member, on the outlet side of the annular plate 22, and is connected by means of a return pipe and a further globe valve (not shown in the drawing) to the top of the pressure vessel.

Operation of the apparatus is similar to that of the embodiment described above. The shut-off valves in the outlet from the vessel and the return pipe are opened and the shut-off valve in the outlet branch is closed. The mixer motor is then started and the impeller rotates, its blades causing material to be drawn into the casing through the aperture in the annular plate and then expelled outwardly through the rings of teeth on the impeller and casing.

Each ring of teeth on the casing serves to impede the outward flow of material and during the time which it spends between adjacent rings of teeth the material is subjected to large shearing forces which cause thorough mixing and milling. The circular plate 26 of the impeller 27 serves to prevent axial flow of material from the upper end of the casing.

When all of the material has traversed the mixer and been mixed to the required extent the shut-off valve in the return pipe is closed and that in the outlet branch is opened so that the material flows through the outlet branch to empty the vessel. Since the mixer acts on the whole of the flow from the vessel it will be appreciated that the material flowing to the outlet branch is in an intimately mixed state.

The pumping action of the embodiment illustrated in FIGURE 2 is determined by the same considerations regarding the size of the aperture 23 relative to the dimensions of the outer sections of blades 28. Reducing the diameter of the aperture 23 from that shown in FIGURE 2 causes an increased pumping action.

We claim:

1. Immersion mixing apparatus, suitable for inclusion in a pipe line, comprising a body member having an inlet and an outlet, the inlet and outlet being adapted each for connection to a pipe, a partition wall within the body member formed with an aperture which effects communication between the inlet and the outlet, a mixer assembly including a mixer casing which is disposed on the outlet side of the partition wall, has an inlet at one end thereof disposed to receive material flowing through the aperture in the partition wall from the body inlet to the outlet, and is formed in a side wall thereof with outlet means opening to the outlet side of the partition wall, an impeller which is mounted on a driven shaft and includes a plurality of blades which, upon rotation of the shaft, sweep out a volume whose radially outer surface corresponds in shape with, and is disposed adjacent to, the inner surface of the side wall of the casing, and means which serve to prevent, or substantially prevent, axial flow of material from the end of the assembly remote from the inlet to the casing, the impeller being adapted to force material entering the casing radially outwardly across the narrow space between the impeller blades and the side wall of the casing to the outlet means and the side wall of the casing impeding the outward flow of material and causing the material to be subjected, during its delayed passage between the impeller blades and the side wall, to large shearing forces which effect mixing of the material.

2. Immersion mixing apparatus as claimed in claim 1, wherein the said means which prevent, or substantially prevent, axial flow of material from the end of the assembly remote from the inlet to the casing include an end wall of the casing, the end wall being formed with an aperture through which the driven shaft extends.

3. Immersion mixing apparatus as claimed in claim 2, wherein the casing has a cylindrical side wall in which the said outlet means are formed.

4. Immersion mixing apparatus as claimed in claim 1, wherein the said means which prevent, or substantially prevent, axial flow of material from the end of the assembly remote from the inlet to the casing comprise a circular plate which is mounted on the driven shaft and from which the impeller blades depend.

5. Immersion mixing apparatus as claimed in claim 4, wherein the partition wall includes an annular plate having a ring of teeth which extend from the plate co-axially of the shaft to form a side wall of the casing, the internal diameter of the ring being substantially equal to that of the volume swept out by the impeller blades.

6. Immersion mixing apparatus as claimed in claim 5, wherein the impeller includes a ring of teeth which extend from the circular plate in an axial direction and are of internal diameter substantially equal to the external diameter of the ring on the casing.

7. Immersion mixing apparatus as claimed in claim 6, wherein the impeller and casing each include a plurality of rings of teeth so arranged that material moving outwardly from the blades passes alternately through a ring of the casing and a ring of the impeller.

8. Immersion mixing apparatus as claimed in claim 1, wherein each blade of the impeller includes a radially outer section which extends to an axial location adjacent the inlet to the casing and which, at the end thereof adjacent the inlet, extends radially inwardly from the side wall of the casing to the radial location of the edge of the inlet.

9. Immersion mixing apparatus as claimed in claim 1, wherein the body member is formed with a lateral opening, a cover plate is provided for the opening, the driven shaft extends through the cover plate, and sealing means are provided between the shaft and cover plate.

10. Immersion mixing apparatus as claimed in claim 1, wherein the inlet and outlet of the body member are of the same size and shape and are disposed co-axially of one another.

References Cited

UNITED STATES PATENTS

| 2,459,036 | 1/1949 | Lipe et al. | 103—103 |
| 2,718,385 | 9/1955 | Greblick et al. | 259—96 X |
| 3,195,867 | 7/1965 | Mould | 259—96 X |

FOREIGN PATENTS

| 69,352 | 1/1952 | Netherlands. |

ROBERT W. JENKINS, *Primary Examiner.*